United States Patent
Giambalvo et al.

(10) Patent No.: US 8,245,218 B2
(45) Date of Patent: *Aug. 14, 2012

(54) APPLICATION PROGRAMMING INTERFACE FOR ADMINISTERING THE DISTRIBUTION OF SOFTWARE UPDATES IN AN UPDATE DISTRIBUTION SYSTEM

(75) Inventors: Daniel Giambalvo, Seattle, WA (US); Jay Thaler, Redmond, WA (US); Kenneth Showman, Redmond, WA (US); David B Dehghan, Seattle, WA (US); Thomas A Sponheim, Seattle, WA (US); Renan Jeffereis, Redmond, WA (US); Kristopher J Owens, Seattle, WA (US); Carey Tanner, Gold Bar, WA (US); Quan Wang, Kenmore, WA (US); Nicole A Hamilton, Redmond, WA (US); Dennis Craig Marl, Seattle, WA (US); Nirmal Rajesh Soy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1731 days.

This patent is subject to a terminal disclaimer.

(21) Appl. No.: 10/537,720

(22) PCT Filed: Mar. 11, 2005

(86) PCT No.: PCT/US2005/008111
§ 371 (c)(1), (2), (4) Date: Jun. 7, 2005

(87) PCT Pub. No.: WO2005/089209
PCT Pub. Date: Sep. 29, 2005

(65) Prior Publication Data
US 2007/0143390 A1    Jun. 21, 2007

Related U.S. Application Data

(60) Provisional application No. 60/553,042, filed on Mar. 12, 2004.

(51) Int. Cl.
*G06F 9/44* (2006.01)
(52) U.S. Cl. .................. 717/172; 717/168; 717/171
(58) Field of Classification Search .................. None
See application file for complete search history.

(56) References Cited

U.S. PATENT DOCUMENTS

| | | | |
|---|---|---|---|
| 6,282,712 B1 | 8/2001 | Davis et al. | |
| 6,678,888 B1 | 1/2004 | Sakanishi et al. | |
| 6,981,061 B1* | 12/2005 | Sakakura | 709/248 |
| 7,519,964 B1* | 4/2009 | Islam et al. | 717/177 |
| 7,617,289 B2* | 11/2009 | Srinivasan et al. | 709/209 |
| 7,853,609 B2* | 12/2010 | Dehghan et al. | 707/778 |
| 2002/0174034 A1* | 11/2002 | Au et al. | 705/27 |
| 2003/0061323 A1 | 3/2003 | East et al. | |
| 2003/0200300 A1* | 10/2003 | Melchione | 709/223 |
| 2004/0019889 A1* | 1/2004 | Melchione et al. | 717/177 |
| 2004/0255291 A1* | 12/2004 | Sierer et al. | 717/174 |
| 2005/0144616 A1* | 6/2005 | Hammond et al. | 717/173 |

* cited by examiner

*Primary Examiner* — Insun Kang
(74) *Attorney, Agent, or Firm* — Zete Law, P.L.L.C.; MacLane C. Key

(57) ABSTRACT

An application programming interface (API) for administering the distribution of software updates on an update service node is presented. The API provides a plurality of interface calls through which an administrator can establish rules by which software updates available to the update service node are distributed.

20 Claims, 11 Drawing Sheets

APPLICATION PROGRAMMING INTERFACE FOR ADMINISTERING THE DISTRIBUTION OF SOFTWARE UPDATES IN AN UPDATE DISTRIBUTION SYSTEM

FIELD OF THE INVENTION

The present invention relates to software and computer networks, and, in particular, the present invention relates to an application programming interface for administering the distributing of software updates in an update distribution system.

BACKGROUND OF THE INVENTION

Nearly all commercially available software products undergo a continual revision process to repair or update features of the software. Each revision of a software product frequently requires adding new files, replacing existing files with newer revisions, deleting obsolete files, or various combinations of these actions. This process of replacing older files, adding new files, and deleting obsolete files of a software product will be referred to hereafter as "updating the product," and the data collection, including binary files, data files, update instructions, metadata, database data, system registry settings, security settings, and the like, used in updating the product will be referred to hereafter more simply as an "update."

Once a software provider has created an update for a software product, either to fix a problem, enhance security, or add new features, the software provider will want to make that update widely available to its customer base. Quite often, such as when the update is directed at correcting a flaw in the product or addressing a critical security issue, the software provider will want that update installed on the customers' computers as soon as possible. Indeed, most software providers have a business incentive to distribute software updates to their customers as quickly and as trouble-free as possible.

The computer industry has experienced an explosive growth in the number of computers connected to networks, and in particular, to the Internet. Due to this explosive growth, and due to the communication abilities available through a connection to the Internet, the Internet has become an important and integral channel for software providers to distribute updates to their customers. In fact, the Internet has become the primary distribution channel for many software providers to provide software updates to their customers. It is often in the best interest of software providers to distribute software updates over the Internet, as electronic update distribution over the Internet reduces their overall costs and enables customers to obtain the software updates as soon as they are available. More and more frequently, these software updates are conducted automatically over the Internet, without any user intervention.

While the Internet is now commonly used as a conduit for distributing software updates from software providers, several issues frequently arise. Two such issues include (1) efficiency relating to the update distribution infrastructure/resources, and (2) administrative control over the distribution and installation of software updates.

In regard to efficiency of the distribution resources, networks, including the Internet, possess only a finite amount of communication resources, often referred to as bandwidth. A finite amount of communication bandwidth frequently results in bottlenecks, especially in regard to software updates for popular software products, such as Microsoft Corporation's Windows® family of operating systems and related productivity products. Such bottlenecks exist even when software updates are made available on multiple download locations distributed throughout the Internet. One reason that such bottlenecks occur is the unstructured access model made available by the Internet. For example, if a first user at computer A requests the latest download of a software product, the download passes through the first user's independent service provider (ISP). Furthermore, the request is treated as a single, individualized access, meaning that the request is treated independent of, and unrelated to, any other network traffic and/or request. As such, if a second user at computer B, who also happens to have the same ISP, requests the same download as the first user, the request from the second user is also treated as a single, individualized access. In this example, the same download will be transmitted over the same infrastructure twice, because each request was treated in isolation. Clearly, if the number of users increases substantially, the finite communication bandwidth will become a bottleneck. In this example, which is quite common, it would have been much more efficient if the download could have been cached at a local location, and each user request satisfied from the local cache.

With regard to control of distribution, many organizations, especially large organizations, have legitimate reasons to control the distribution of updates to their computers. For example, unfortunately some updates have or introduce flaws, frequently referred to as bugs, that "break" features of a software product. These broken features may be insignificant, but all too often they can disrupt a business's mission-critical features. As a business cannot afford to lose its mission-critical features, a responsible business will first evaluate and test each software update within a controlled environment for some period of time prior to releasing the update to the remainder of their computers. This evaluation period permits the organization to validate whether an update will adversely affect a mission-critical feature. Only after it has been satisfactorily determined that an update will not bring down any mission critical feature is the update permitted to be distributed to the remainder of the organization's computers. Clearly, most organizations must exercise control over the installation of software updates on their computers.

Another reason that a business or an organization often needs to control distribution of software updates is to ensure consistency among the computers in the organization. It is very important for information service departments to have a standardized, target platform upon which all computers operate, whether it is for a word processor or an operating system. Without a standard, software and computer maintenance may be unnecessarily complex and difficult.

Still another reason that local control is important is for billing purposes. In large organizations, it is often inefficient to individually install software on a computer, or to individually maintain licenses for a particular software product for each computer in the organization. Instead, a single site license permits an organization to run a software product on numerous computers. Thus, an organization may be required to report the number of computers running a product under the site license, or may need to limit the number of computers running a product under a site license. All of these reasons often require local control over software update distribution.

In light of the various above-identified issues relating to software update distribution, what is needed is an extensible software update distribution architecture for providing control over the distribution of software updates, as well as increasing their distribution efficiency. The present invention addresses these and other issues found in the prior art.

SUMMARY OF THE INVENTION

According to aspects of the present invention, an update service node having an application programming interface for administering the distribution of software updates on the update service node, is presented. The update service node includes an update store for storing software updates. The update service node also includes an update web service through which the update service node obtains software updates from a parent update service node over a communication network, and through which the update service node distributes software updates to child update service nodes over the communication network. Still further, the update service node includes an administration application programming interface (API) through which an administrator establishes controls the distribution of software updates to child update service nodes and client computers, wherein the administration API is an object exposing a plurality of interface calls through which the administrator establishes said rules.

According to additional aspects of the present invention, an application programming interface (API) for administering the distribution of software updates on an update service node, is presented. The API comprises a get configuration interface call which returns a configuration interface object for reading and writing software update administration configuration values to the update service node. The API further comprises a get subscription interface call which returns a subscription interface object defined on the update service node. The API still further comprises a get update interface call which returns a update interface object corresponding to an update identifier passed in the get update interface call, as well as a get updates interface call which returns an update collection object containing update interface objects corresponding to values passed in the get updates interface call. The API also comprises a get computer interface call which returns an client computer object corresponding to the a client computer associated with the update service node and that was identified in the get computer interface call, and a get computers interface call which returns a computer collection object including client computer objects corresponding to client computers associated with the update service node. Additionally, the API comprises a get group interface call which returns an target group object that was identified in the get group interface call, and a get groups interface call which returns a target group collection object including target group objects corresponding to target groups on the update service node.

According to still further aspects of the present invention, a software update distribution system for distributing software updates, is presented. The software update distribution system comprises an update service node and an administration application programming interface (API) associated with the update service node. The administration API is an interface object exposing a plurality of interface calls for controlling the distribution of software updates. The administration API includes a get configuration interface call which returns a configuration interface object for reading and writing software update administration configuration values to the update service node. The API further includes a get subscription interface call which returns a subscription interface object defined on the update service node. The API still further includes a get update interface call which returns a update interface object corresponding to an update identifier passed in the get update interface call, as well as a get updates interface call which returns an update collection object containing update interface objects corresponding to values passed in the get updates interface call. The API also includes a get computer interface call which returns an client computer object corresponding to the a client computer associated with the update service node and that was identified in the get computer interface call, and a get computers interface call which returns a computer collection object including client computer objects corresponding to client computers associated with the update service node. Additionally, the API includes a get group interface call which returns an target group object that was identified in the get group interface call, and a get groups interface call which returns a target group collection object including target group objects corresponding to target groups on the update service node.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
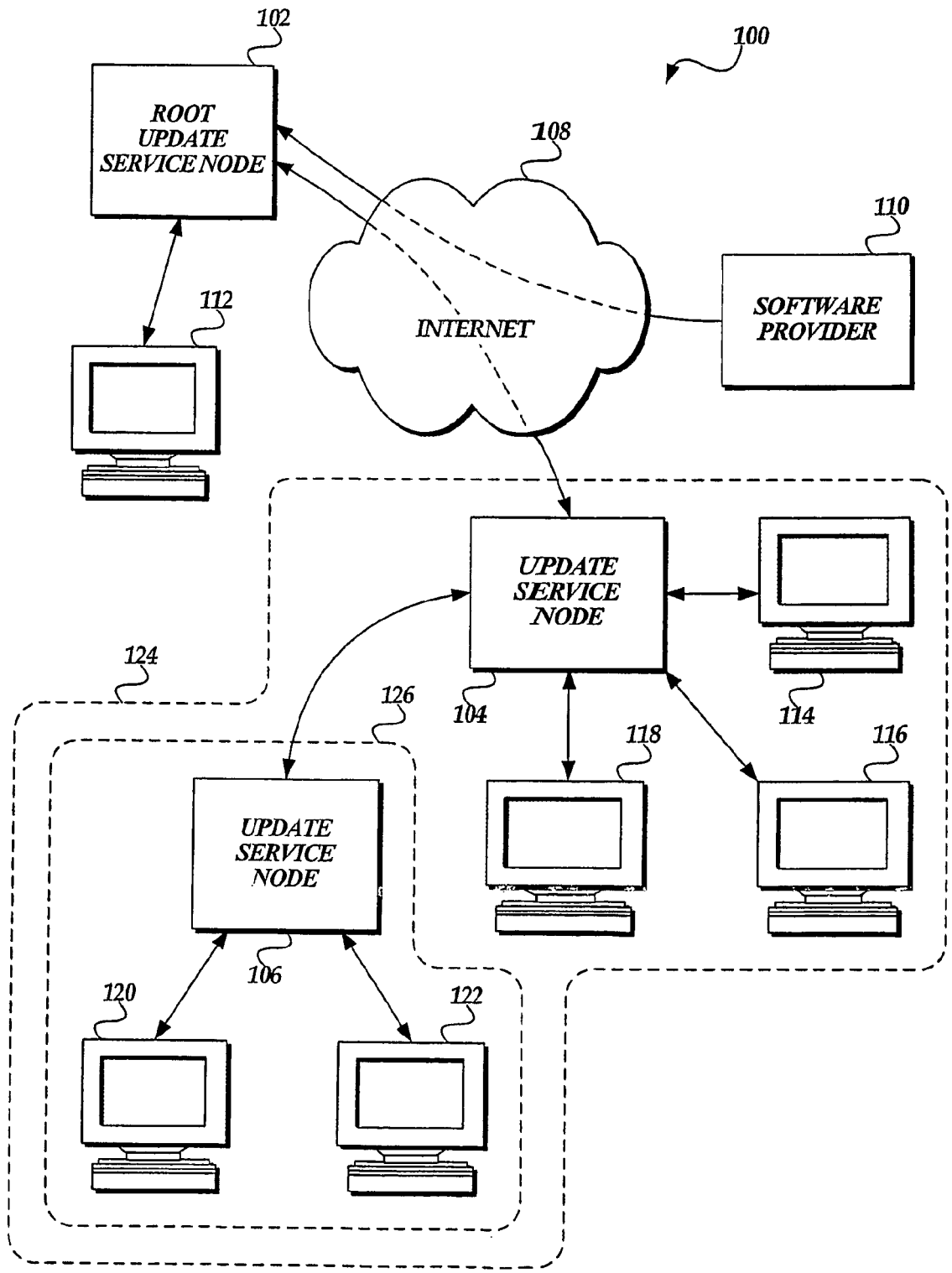
FIG. 1 is a pictorial diagram of an exemplary update distribution system formed in accordance with aspects of the present invention.

According to aspects of the present invention, an update distribution system, organized in a hierarchical fashion, for distributing software updates is presented. FIG. 1 is a pictorial diagram of an exemplary update distribution system 100 formed in accordance with aspects of the present invention. According to the present invention, at the "top" of an update distribution system, such as the illustrated update distribution system 100, is a root update service node 102. Software providers, such as software provider 110, distribute their software updates through the update distribution system 100 by submitting the updates to the root update service node 102. According to aspects of the present invention, software providers, such as software provider 110, may submit their software updates to the root update service node 102 through a network, such as the Internet 108.

A hierarchical update distribution system, such as the exemplary update distribution system 100, will likely include at least one other update service node in addition to the root update service node 102. As illustrated in FIG. 1, the exemplary update distribution system 100 includes root update service node 102 and two additional update service nodes: update service node 104 and update service node 106. According to the present invention, each hierarchical update distribution system is organized in a tree-like structure underneath the root update service node 102. In other words, each update service node in an update distribution system has zero or more child update service nodes. Thus, while the exemplary update distribution system 100 shows that each parent update service node, i.e., the root update service node 102 and update service node 104, have only one child, it is for illustration purposes only, and should not be construed as limiting upon the present invention. Furthermore, with the exception of the root update service node 102, each update service node in an update distribution system has one parent update service node. Accordingly, as shown in FIG. 1, update service node 104 is a child node to the root update service node 102, and update service node 106 is a child node to update service node 104. As can be seen, each update service node, with the exception of the root update service node 102, can be both a child update service node and a parent update service node.

As illustrated in the exemplary update distribution system 100, the root update service node 102 communicates with update service node 104 through the Internet 108. However, it should be understood that this is illustrative only, and should not be construed as limiting upon the present invention. Each update service node in an update distribution system need only be able to communicate with its parent and/or children through some communication network. Thus, while update service node 104 communicates with its parent, root update service node 102, through the Internet 108, it may alternatively communicate with its child update service nodes, such as update service node 106, via a local area network 124.

Also shown in FIG. 1, update service node 106 resides within a sub-network 126 of the local area network 124. As an example, local area network 124 may correspond to an organization's general corporate network, and update service node 104 represents the corporation's link to the update distribution system 100, via its connection to its parent, root update service node 102. Further, sub-network 126 may correspond to an identifiable group of computers within the corporate network, such as a test/evaluation group, a remotely located office, or a mission critical group. As will be described in greater detail below, according to aspects of the present invention, an administrator on update service node 104 is able to control the distribution of updates to update service node 106, and ultimately to client computers.

It should be appreciated that each update service node, including both the root update service node 102 and update service nodes 104 and 106, is configured to distribute software updates to both child update service nodes as well as client computers. As shown in FIG. 1, the exemplary update distribution system 100 includes client computers 112-122. Each update service node, including the root update service node 102, distributes updates to child update service nodes and client computers according to local configuration information. According to one embodiment, an administrator defines groups and associates update distribution rules with those groups. Each update service node has at least one distribution group.

As an example to illustrate how the update distribution system operates, assume that local area network 124 corresponds to a business organization's corporate network. According to one embodiment of the present invention, an administrator, on update service node 104, may define multiple distribution groups for the corporate network 124, including an evaluation group, corresponding to the sub-network 126 including update service node 106 and client computers 120 and 122, for evaluating the suitability of an update for the general corporate network 124, as well as a general corporate group including the update service node 104 and client computers 114-118.

With regard to the evaluation group, the administrator includes the update service node 106 as a member, and associates rules with that group such that updates are immediately distributed to the evaluation group's members as they become available. Alternatively, with regard to the general corporate group, the administrator adds client computers 114-118, and associates a rule such that updates are only distributed to the general corporate group members if specifically authorized by the administrator. Assume also that an administrator for child update service node 106 creates a default group consisting of the client computers 120 and 122 in the evaluation sub-network 126, to which any new software update may be immediately distributed.

Continuing the above example, a software provider 110 submits a software update to the root update service node 102. According to rules established at the root update service node 102, the update is eventually distributed to the corporate update service node 104. Upon receiving the update, per the rules established by the administrator, the corporate update service node 104 distributes the update to the members of the evaluation group (defined as only the child update service node 106), but withholds the update from the general corporate group pending specific authorization to distribute the update to that group.

Continuing the above example, upon receiving the update, the evaluation update service node 106 processes the update with respect to each defined group. In this example, the evaluation update service node 106 has only one group. However, as previously mentioned, in an actual implementation, there may be multiple groups defined, each with a unique set of associated distribution rules. For this example, the evaluation update service node 106 immediately makes the update available for distribution to client computers 120 and 122. Client computers 120 and 122 may now be updated and the evaluation period/process may begin.

Still continuing the above example, when the administrator on the corporate update service node 104 is sufficiently satisfied that the update is suitable for distribution over the entire corporate network 124, the administrator then explicitly authorizes the update to be distributed to the members of the general corporate group. The corporate update service node 104 correspondingly makes the update available to client computers 114-118. It should be understood that the evaluation update service node 106 may also be included in the general corporate group. However, because the evaluation update service node 106 has already been updated, no additional update-related action is needed for distributing the update to the evaluation sub-network 126.

As can be seen by the above example, the present invention offers significant benefits in terms of local distribution control and download efficiency. In addition to the above-described aspects of local distribution control, significant savings in communication bandwidth are also realized. For example, while the exemplary corporate network 124 illustrated in FIG. 1 includes five client computers, the software provider's update was downloaded from the root update service node 102 to the corporate update service node 104 only one time. Clearly then, as the number of client computers serviced by an update service node increases, the communication bandwidth usage between a parent update service node and a client update service node remains constant, thereby substantially reducing the amount of communication bandwidth that would otherwise be used. Additionally, the update distribution system is both extensible and scalable. The update distribution system is extensible in at least two ways: any number of child update service nodes may be added to a parent update service node, and child update service nodes may also be a parent update service node. Each sub-tree of the update distribution system may therefore be tailored to meet individual needs.

Figure 2:
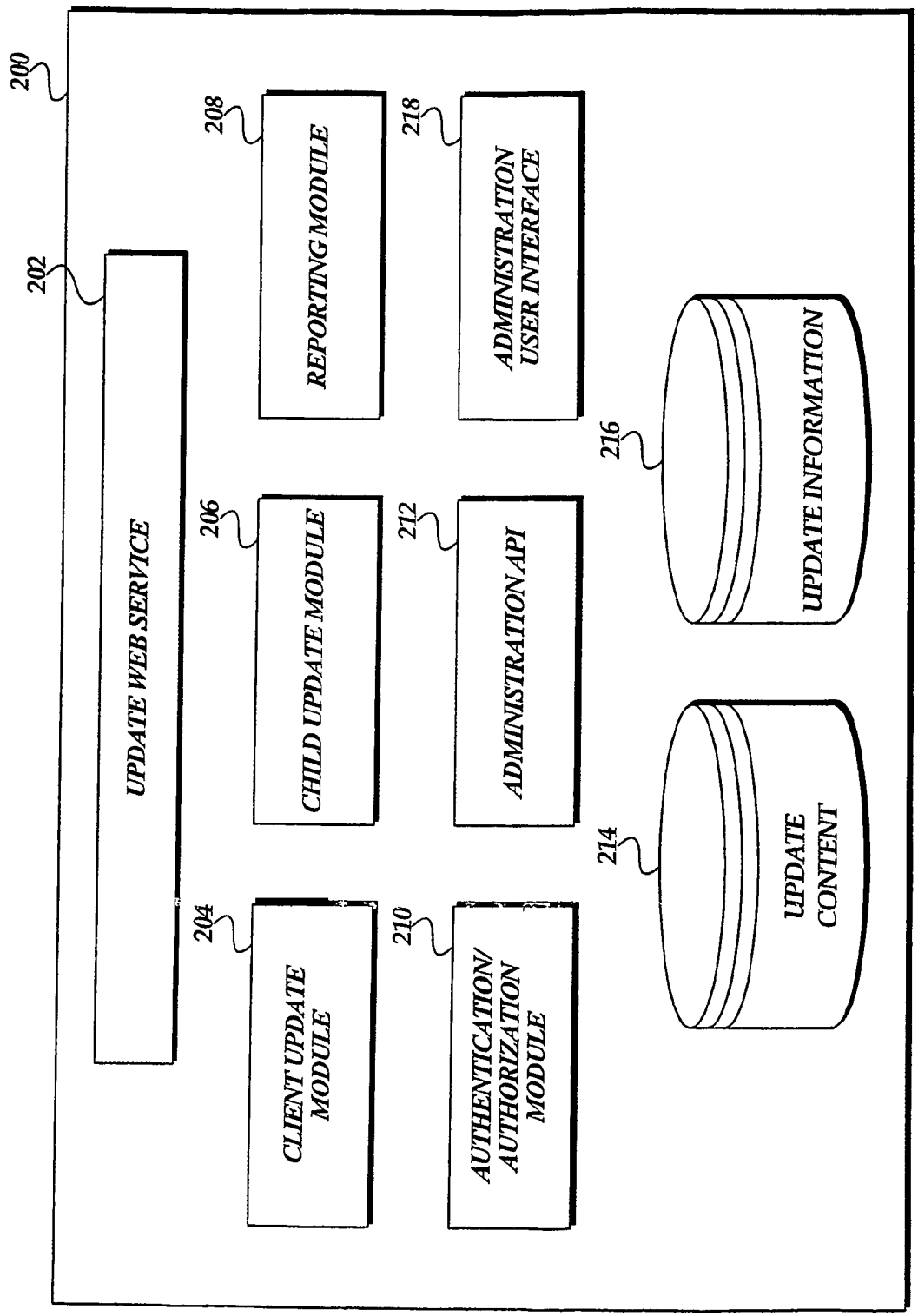
FIG. 2 is a block diagram illustrating exemplary logical components of an update service node formed in accordance with aspects of the present invention.

FIG. 2 is a block diagram illustrating exemplary logical components of an update service node 200, such as the corporate update service node 104 (FIG. 1) or the evaluation update service node 106 (FIG. 1), formed in accordance with aspects of the present invention. As shown in FIG. 2, an update service node 200 includes an update web service 202, a client update module 204, a child update module 206, and a reporting module 208. The exemplary update service node 200 also includes an authentication/authorization module 210, an administration application programming interface (API) 212, an update content store 214, an administration user interface 218, and an update information store 216.

The update web service 202 provides a common set of Web services through which client computers, child update service nodes, and a parent update service node can communicate with an update service node. For example, with reference to FIG. 1, in order for the child/evaluation update service node 106 to obtain a software update from the parent/corporate update service node 104, the client communicates through the parent's update web service 202. Similarly, when a parent update service node, such as root update service node 102, has information, including updates, to communicate to its child update service node 104, the parent update service node communicates through the child's update web service 202.

In an actual embodiment of the present invention, the common set of Web services provided by the update web service 202, generally referred to as the web services interface, includes the following calls: GetServerAuthConfig for obtaining authentication configuration information from a parent update service node; GetConfigData and GetServerConfigData for obtaining parent update server node configuration information and properties; GetServerCookie for obtaining an authorization token from a parent update service node; GetRevisionIdList for obtaining an update list from a parent update service node; GetUpdateData for obtaining update metadata and update payloads from a parent update service node; and ReportEvents for reporting the update activity that occurred on an update service node to its parent update service node.

The client update module 204 handles communications between a client computer and the update service node 200 in regard to updates and update information stored on the update service node. The update-related communications include, but are not limited to, distributing updates in response to client requests and providing a list of available software products and associated updates for the client computer. The client update module 204 is also responsible for determining whether a client computer is authorized to obtain a particular update according to associated distribution rules, and responds to a client computer with the update-related information that the client computer is authorized to access.

The child update module 206 handles update-related communications between a parent update service node and its child update service nodes. The update-related communications include, but are not limited to, identifying lists of software products and associated updates available to a child update service node, as well as responding to update requests from a child update service node. The downstream update module 206 is responsible for determining whether a child update service node is authorized to obtain a particular update according to associated distribution rules, and responds to a child update service node with the update-related information that the child update service node is authorized to access.

The reporting module 208 generates update-related reports, such as which groups have or have not received a particular update, which client computers have or have not downloaded/installed an update, what updates are available on the update service node, and the like. These reports may be used internally, such as by an administrator, and also submitted to the parent update service node, via the parent's update service interface 202. As described above, it is often necessary for corporations to determine which client computers have a particular update installed, such as for billing purposes or for maintenance purposes. Information/reports generated by the reporting module 208 may be the basis of these reports.

Figure 4A:
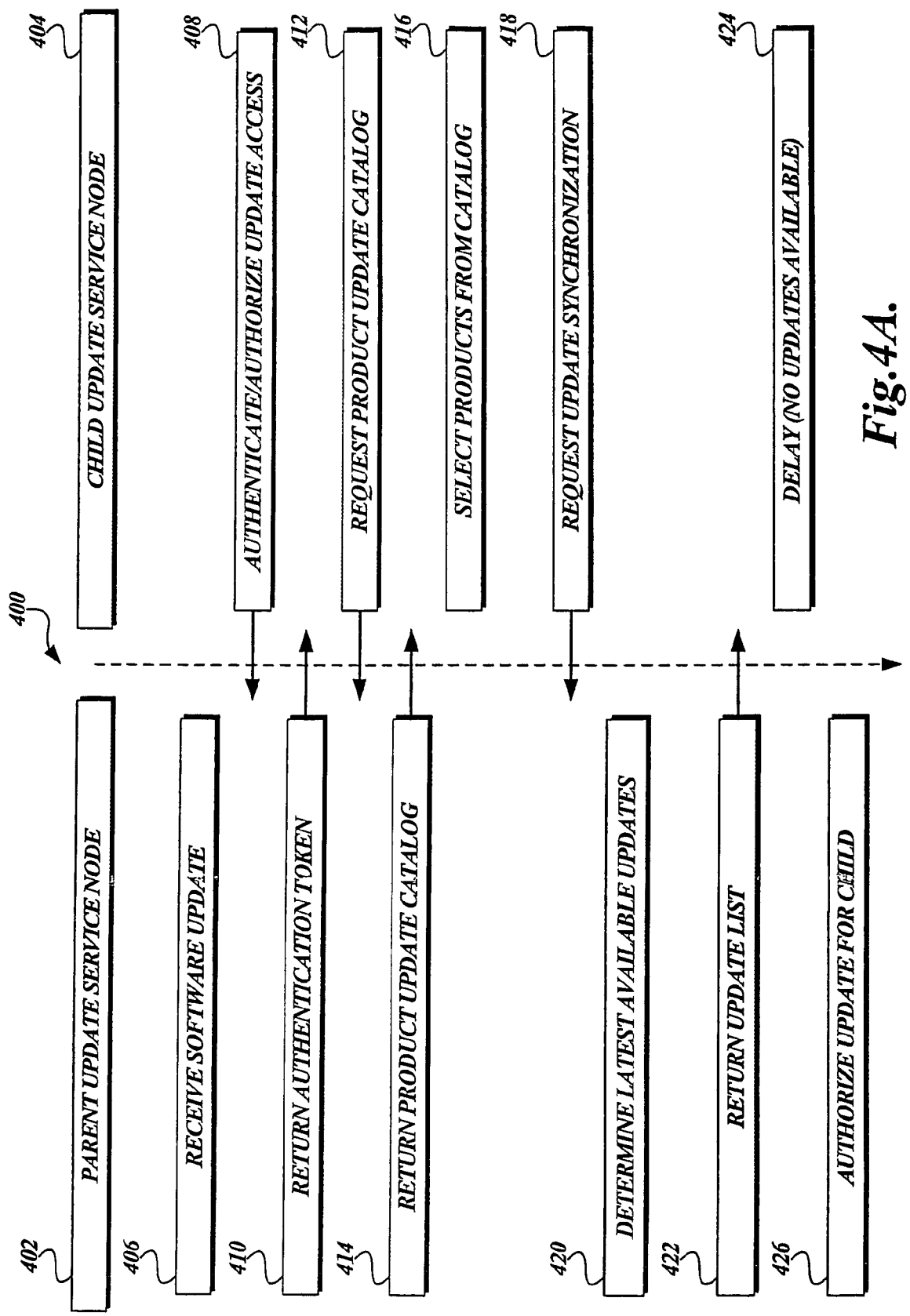
FIG. 4 is a block diagram illustrating an exemplary exchange between a parent update service node and a child update service node in providing a software update from the parent update service node to the child update service node in accordance with aspects of the present invention.

The authentication/authorization module 210 is responsible for authenticating, i.e., determining the identity of, a particular client computer or child update service node, and determining whether a client computer or child update service node is authorized to access available updates at the update service node 200. To those client computers and child update service nodes that are authenticated and authorized to access updates on an update service node, the authentication/authorization module 210 issues an authorization token that must be used in conjunction with obtaining updates. The issuance and use of an authorization token is described in greater detail below in regard to FIGS. 4A and 4B.

The administration API 212 represents the application interface through which control of the update service node 200 is exercised, and through which updates ultimately are stored and distributed. When the update web service 202 receives various update-related requests from client computers and child update service nodes, these requests are ultimately broken into calls into the administration API 212, either directly or indirectly through the client update module 204 and the child update module 206. In conjunction with the administration user interface 218 or some other program installed on the update service node 200 suitably configured to use the administration API 212, an administrator ultimately controls all aspects of the update process for that update service node, as well as any child update service nodes and client computers. An actual embodiment of an administration API is described in greater detail below in regard to FIG. 9.

Through the administration user interface 218, administrators may configure and maintain an update service node 200, via the administration API 212. Thus, through the administration user interface 218, an administrator creates, modifies, and deletes groups, as well as associating rules for each group. Furthermore, using the administration user interface 218, an administrator establishes to which group a client computer or child update service node belongs. Through the administration user interface 218, an administrator may also explicitly authorize the distribution of updates to client computers or child update service nodes, configure the update service node 200 to periodically query its parent update service node for new updates, configure reporting parameters and view internal reports, and the like. As mentioned above, while the administration user interface 218 permits an administrator to exercise control over aspects of the update service node 200, another application residing on the update service node 200, suitably adapted to operate with the administration API 212, may be used instead of the administration user interface 218.

As mentioned above, according to one embodiment of the present invention, an update service node 200 includes both an update content store 214 and an update information store 216. The update content store 214 stores the actual files representing the software updates, such as binaries and patch files. In contrast, the update information store 216 stores information and metadata corresponding to the updates available on the update service node 200, including the update files stored in the update content store 214. According to one embodiment, the update content store 214 and the update information store 216 are both relational databases. While the exemplary update service node 200 is shown as having two data stores, the present invention should not be so limited. In an alternative embodiment, both the update content store 214 and the update information store 216 may be combined in a single information store.

In accordance with aspects of the present invention, a software update may be presented as being "available" on an update service node 200 to client computers and child update service nodes even though the update is not stored physically in the update content store 214. More particularly, rather than immediately downloading and storing the actual update files on an update service node 200, a link referencing the update files on the parent update service node or elsewhere, may instead be stored on the update service node. Thus, if a client computer requests the update, or a child update service node requests the actual update, the update is then brought down from the parent update service node and stored in the update content store 214, in preparation for delivering it to the client computer or child update service node. Those skilled in the art will recognize this type of update access is referred to as just-in-time downloading. In this manner, an "available" update, need not be distributed over the various network channels until it is actually requested. According to aspects of the present invention, an administrator of an update service node 200 may selectively determine whether to obtain software updates in a just-in-time manner.

While the above description of FIG. 2 illustrates various components of an exemplary update service module 200, it should be appreciated that other components of an update service module may also exist. Furthermore, the above described components should be understood to be logical components, not necessarily actual components. In an actual implementation, the above identified components may be combined together and/or with other components according to implementation determinations. Additionally, it should be appreciated that while an update service node 200 may be viewed as a server computer on a network, in an actual implementation, an update service node may be implemented on any number of types of computing devices. For example, each update service node 200 may be implemented and/or installed on a single stand-alone computer system or, alternatively, on a distributed computing system comprising multiple computing devices.

Figure 3:
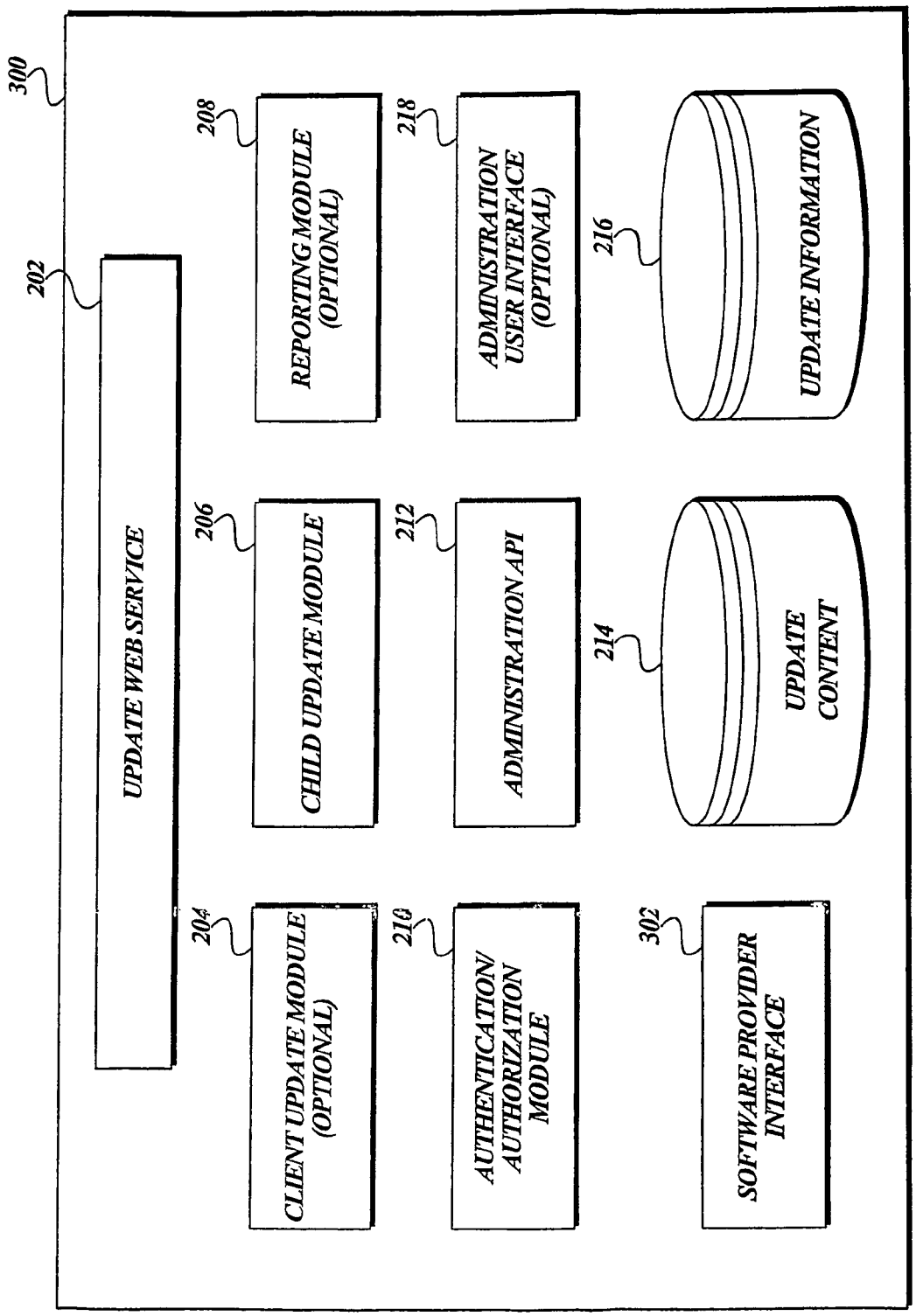
FIG. 3 is a block diagram illustrating exemplary logical components of a root update service node formed in accordance with aspects of the present invention.

FIG. 3 is a block diagram illustrating exemplary logical components of a root update service node 300, such as the root update service node 102 illustrated in FIG. 1, formed in accordance with aspects of the present invention. Similar to the logical components of an update service node 200 (FIG. 2), a root update service node 300 includes an update web service 202, a child update module 206, and an authentication/authorization module 210. Additionally, an exemplary root update service node 300 also includes an administration API 212, an update content store 214, and an update information store 216. Optionally, the root update service node 300 may also include a client update module 204, a reporting module 208, and an administration user interface 218.

The client update module 204 is an optional component for a root update service node 300 depending on whether the root update service node provides software updates directly to client computers. For example, with reference to FIG. 1, root update service node 102 would include the optional client update module 204 as the root update service node that directly services client computer 112. However, if a root update service node 300 were not to directly service client computers, the client update module 204 could be omitted.

The reporting module 208 is optional for a root update service node 300 because a root update service node has no parent update service node to whom update reports are provided. However, to the extent that update reports are desirable to the root update service node's administrator, the reporting module 208 may be optionally included.

In addition to comprising the logical components included in an update service node 200 (FIG. 2), the root update service node 300 also includes a software provider interface 302. The software provider interface 302 provides the communication interface by which a software provider 110 (FIG. 1) submits software updates directly to the root update service node 300, and indirectly to the exemplary update distribution system 100.

Similar to the update service node 200 of FIG. 2, the above description of FIG. 3 illustrates various components of an exemplary root update service module 300. However, it should be appreciated that other components of a root update service module may also exist. Furthermore, the above described components should be understood to be logical components, not necessarily actual components. In an actual implementation, the above identified components may be combined together and/or with other components according to implementation determinations. Additionally, it should be appreciated that while a root update service node 200 may be viewed as a server computer on a network, in an actual implementation, an update service node may be implemented on any number of computing devices. For example, the root update service node 300 may be implemented and/or installed on a single stand-alone computer system or, alternatively, on a distributed computing system comprising multiple computing devices.

In order to better understand how an update is distributed from the root update service node throughout an update distribution system 100, an illustration of an exemplary exchange between a parent update service node and a child update service node is warranted. FIG. 4 is a block diagram illustrating an exemplary exchange 400 between a parent update service node 402 and a child update service node 404 in propagating a software update from the parent update service node to the child update service node, in accordance with aspects of the present invention. As can be seen, the exemplary diagram 400 is divided in half, the left half of which corresponds to actions and events of the parent update service node 402, and the right half corresponding to actions and events of the child update service node 404.

For purposes of discussion with regard to FIG. 4, it should be further understood that the parent update service node 402 may or may not be the root update service node in the update distribution system 100. Additionally, for purposes of this discussion, it is assumed that the parent update service node 402 has been configured by an administrator such that the child update service node 404 may not receive software updates unless explicitly authorized to do so by the administrator.

As shown in the exemplary exchange 400, beginning at event 406, the parent update service node 402 receives a software update from a software provider 110, either directly, if the parent update service node is the root update service node 102, or indirectly through the update distribution system 100. At some point after the parent update service node 402 receives the software update from the software provider 110, the child update service node 404 begins a process for obtaining software updates from the parent update service node.

According to one embodiment, a child update service node 404 can be configured to automatically obtain the software updates available from a parent update service node 202 on a periodic basis. More particularly, an administrator, via the administration user interface 218, may selectively configure the child update service node 404 to automatically obtain the latest software updates available on the parent update service node 402 on a periodic basis. As one example, an administrator may configure the child update service node 404 to obtain the latest software updates from its parent update service node 402 on a daily and/or hourly basis, as well as specify the time-of-day that the automatic update process is to commence. Other periodic schedules and criteria may also be utilized. Similarly, an administrator may manually initiate the update process through the administration user interface 218.

To begin the updating process, at event 408 the child update service node 404 authenticates and authorizes itself with the parent update service node 402. Authenticating and authorizing with the parent update service node 402 provides an element of control over the distribution of software updates, limiting update distribution to authorized update service nodes. Authenticating and authorizing techniques are well known in the art, any number of which may be employed to authenticate and authorize a child update service node 404 with the parent update service node 402. The present invention is not restricted to any one technique.

After properly authenticating and authorizing with the parent update service node 402, at event 410 the parent update service node 402 returns an authorization token to the child update service node 404. According to one embodiment, an authorization token is a time sensitive token providing the child update service node 404 authorization to conduct further update activities with the parent update service node for a limited amount of time. Thus, if the child update service node 404 is not properly authenticated and authorized with the parent update service node, no authorization token is returned and the child update service node is unable to perform any other update-related activities except authentication and authorization. Similarly, after the update token has expired, the child update service node 404 is unable to perform any further update-related activities with the parent update service node 402 except reauthentication and reauthorization.

After receiving the authorization token, at event 412 the child update service node 404 submits a request to the parent update service node for a product update catalog along with the authorization token. A product update catalog represents a listing, or table of contents, of software products for which the parent update service node 402 distributes software updates.

According to aspects of the present invention, a child update service node 404 is not required to propagate all software updates available on its parent update service node 402. For example, with reference to the exemplary update distribution system of FIG. 1, the corporate update service node 104 may have site licenses to only a fraction of software products available on the root update service node 102. Accordingly, it would be unnecessary for the corporate update service node 104 to obtain all software updates available at the root update service node 102, as most would never be used. Accordingly, an administrator on an update service node may selectively establish which software product updates will be available on the update service node.

According to one aspect of the present invention, the update product catalog, obtained from a parent update service node 402, identifies all software products for which updates are available, whether or not the child update service node 404 is configured to distribute updates for each product. However, according to an alternative aspect of the present invention, the update product catalog, obtained from a parent update service node 402, identifies only those software products for which the requesting child update service node is configured to distribute updates. For example, limiting which software products are listed in the product update catalog may be determined according to the group or groups to which the child update service node 404 belongs.

At event 414, the parent update service node 402 returns a product update catalog to the child update service node 404. At event 416, the child update service node 404 selects those products from the product update catalog for which the latest updates are currently desired. It should be noted that even though the product update catalog may list only those software products that the child update service node 404 distributes, the child update service node may be configured to obtain updates for different software products at different times or on different periodic schedules.

At event 418, the child update service node 404 submits an update synchronization request, along with the authorization token, identifying the selected products for whose updates the child update service node is currently seeking. Included in the synchronization request is information identifying the latest update available for a product on the child update service node 404. Information identifying the latest update for a product is hereafter referred to as an "update anchor." Update anchors for each software product are typically stored in the update information store 216 (FIG. 2). In one embodiment, an update anchor includes a revision number and a date associated with the revision number.

In response to the update synchronization request, at event 420 the parent update service node 402 determines which, if any, new updates are available for the child update service node 404. As mentioned above, this determination is based on the specific rules associated with particular software updates and the group or groups of which a child update service node 404 is a member, as well as the update anchor. For this example, as previously mentioned, the previously received software update was explicitly not authorized for the child update service node 404. Therefore, the software update received at event 406 is not determined to be "available" to the child update service node 404. Accordingly, at event 422 an update list is returned to the child update service node 404 without identifying the software update received at event 406. According to aspects of the present invention, the update list identifies all of the updates "available" on the parent update service node 402 according to the synchronization request. In one embodiment, the update list identifies each "available" update information by a unique identifier associated with an update.

At event 424, because the update list is empty, i.e., no updates are currently "available" on the parent update service node 402, the update process of the child update service node 404 simply delays, or sleeps, for a predetermined amount of time. According to the current example, during this delay period, at event 426, an administrator at the parent update service node 402 authorizes the software update, received at event 406, to be distributed to the child update service node 404.

At event 428 (FIG. 4B), the child update service node 404 again begins the automatic update process by authenticating and authorizing itself with the parent update service node 402. In response, at event 430, the parent update service node 402 returns an authorization token to the child update service node 404.

At event 432, the child update service node 404 submits a request, along with the authorization token, to the parent update service node 402 for a product update catalog. At event 434, the parent update service node 402 returns the product update catalog to the child update service node 404. At event 436, the child update service node 404 selects the products for the update catalog for which updates are desired. At event 438, the child update service node 404 submits the update synchronization request identifying those selected products with the authorization token.

Because the child update service node 404 has been authorized to obtain the software update previously received at event 406, at event 440 the parent update service node 402 determines that the software update is "available" for the child update service node and includes corresponding update information in the update list. Thereafter, at event 442, the parent update service node 402 returns the update list, now identifying the software update received at event 406, to the child update service node 404.

With an update list identifying an "available" update on the parent update service node 402, the child update service node 404 now has the information necessary to obtain the software update. According to one embodiment of the present invention, a child update service node 404 obtains the software update from the parent update service node 402 in two parts: obtaining update metadata, and obtaining the update content or file, hereafter referred to as the update payload. According to additional aspects of the present invention, the update metadata describes pertinent aspects of the software update, including, but not limited to: an update identifier that uniquely identifies the update, revision number information associated with the software update, whether the software update should be considered a priority, language specific information, relationships to other software updates, location of the update payload for downloading purposes, installation handler routines, and the like.

Some of the reasons that it is often beneficial to download the entire software update in two parts, i.e., the update metadata and the update payload, is that the update payload is often substantially larger than the update metadata, and the update payload is not always immediately needed, i.e., needed for installation on a client computer, if it is ever needed. Thus, according to one embodiment of the present invention, the update payload is downloaded separately from the update metadata, and only when needed. Those skilled in the art will recognize this downloading technique as lazy downloading, or alternatively as just-in-time downloading. According to aspects of the present invention, an administrator may configure an update service node to obtain the update payload in a just-in-time fashion, or immediately upon obtaining the update metadata. Furthermore, in an alternative embodiment, both update metadata and the update payload may be downloaded jointly.

Figure 4B:
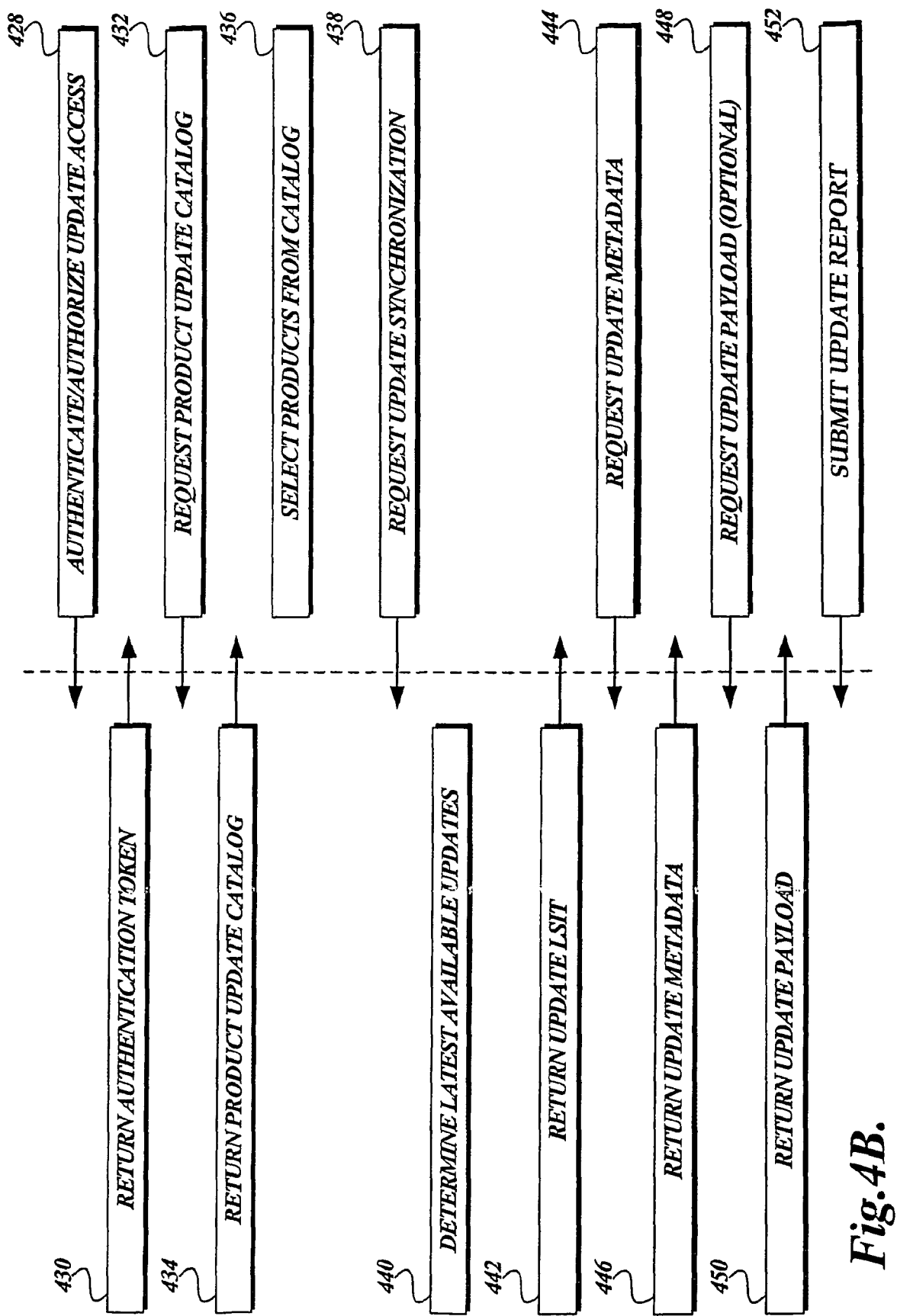

As shown in FIG. 4B, with an update identified in the update list, at event 444, the child update service node 404 requests the update metadata for the "available" software update according to its unique identifier in the update list. As with most other communication exchanges with the parent update service node 402, the update request is submitted with the authorization token. It should be noted that while in the illustrated example, all update metadata is downloaded in one access, according to alternative aspects of the present invention (not shown), the update metadata may be downloaded in more than one access. For example, in a first access, only elements of the update metadata to are necessary to determine whether a software update is applicable and/or desirable is first downloaded, such as applicability rules and dependencies upon other software updates. Then, after it is determined that an update is applicable and/or desirable, the remainder of the update metadata may be obtained. In response, at event 446 the parent update service node 402 returns the update metadata for the software update child update service node 404, which in turn stores the update metadata into the update information store 216.

In one embodiment, the update metadata includes, but is not limited to: a unique identifier associated with a particular update; a description of the update, such as size of the update, problems addressed by the update, revision/anchor information, and the like; update applicability rules, such as whether the update requires a previous update to be installed, whether the update must be installed separately, whether the update supersedes other available updates, and the like; end user license agreement data; and URL information for locating and/or accessing the update payload if it is not stored on the parent update service node 402.

Optionally, at event 448, the child update service node 404 submits a request to download the update payload from the parent update service node 402. In response, at event 450, the parent update service node 402 returns the update payload to the child update service node 404, which in turn stores it in the update content store 214.

Because update activity has now occurred on the child update service node 404, at event 452, the child update service node generates and submits an update report to the parent update service node 402 outlining the update activities that have just recently occurred. Thereafter, the child update service node 404 again delays until the next time that the update process is scheduled to run (not shown).

Those skilled in the art will appreciate that the above described events are for illustration purposes, and reflect one particular exemplary set of events and circumstances. Clearly, other events may also occur according to specific details and circumstances which will cause some variation to the above described events. Additionally, it should be understood that while the child update service node 404 is obtaining the latest "available" software updates from the parent update service node 402, the child update service node may simultaneously be processing update requests from its child update service nodes. Accordingly, the above sequence of events should be viewed as illustrative only, and not limiting upon the present invention.

Figure 5:
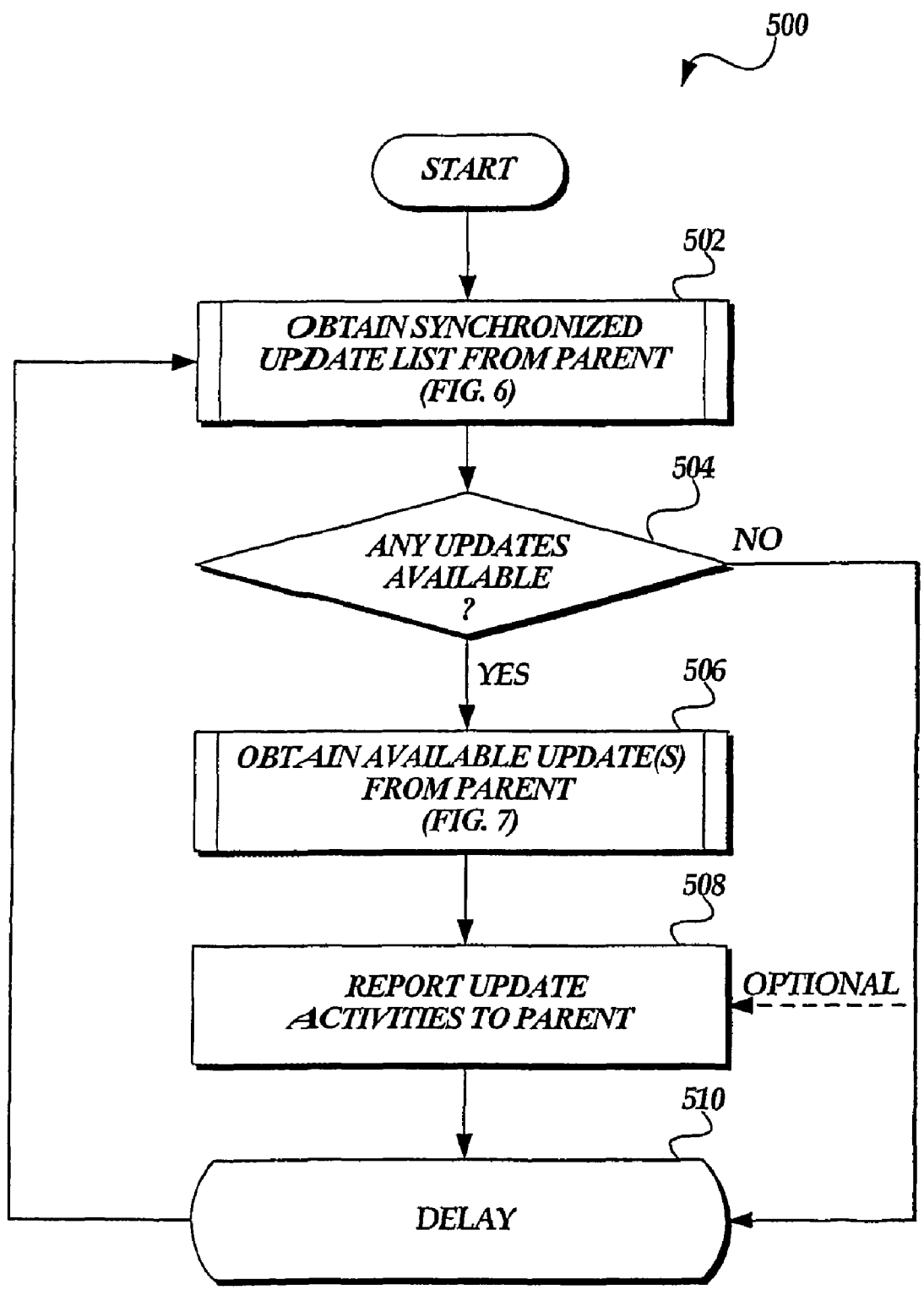
FIG. 5 is a flow diagram illustrating an exemplary routine executed on a child update service node to periodically obtain updates from its parent update service node.

FIG. 5 is a flow diagram illustrating an exemplary routine 500 executed on a child update service node, such as the corporate update service node 104 of FIG. 1, for periodically obtaining updates from its parent update service node. Beginning at block 502, the child update service node obtains a synchronized update list of "available" updates from the parent update service node. Obtaining a synchronized update list of "available" updates from the parent update service node is described below with regard to FIG. 6.

Figure 6:
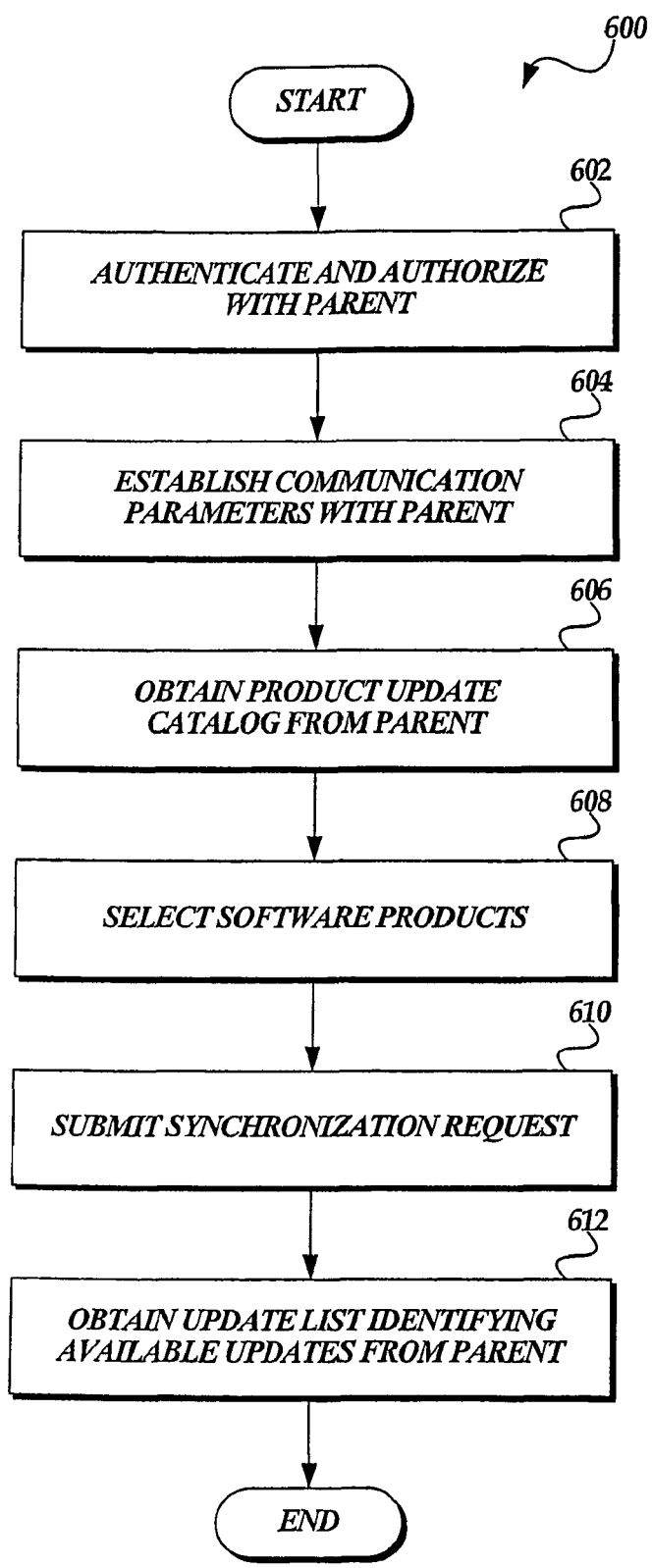
FIG. 6 is a flow diagram of an exemplary subroutine suitable for use in the exemplary routine of FIG. 5 for obtaining an update catalog from a parent update service node.

FIG. 6 is a flow diagram of an exemplary subroutine 600, suitable for use in the exemplary routine 500 of FIG. 5, for obtaining a synchronized update list of "available" updates from a parent update service node. Beginning at block 602, as previously discussed with regard to FIGS. 4A and 4B, the child update service node authenticates and authorizes itself with the parent update service node and, in response to proper authentication and authorization, receives an authorization token. At block 604, in conjunction with the authorization token, the child update service node establishes communication parameters with the parent update service node. Establishing communication parameters permits the parent and child update service nodes to properly establish a common basis that both the parent and child understand. The communication parameters include, but are not limited to: communication update protocols or versions; product groupings; and the like.

After having established communication parameters with the parent update service node, at block 606, the child update service node obtains a product update catalog describing software products for which the parent update service node provides/distributes updates. At block 608, the child update service node selects those software product updates for which updates are currently sought. At block 610, the child update service node submits an update synchronization request to the parent update service node, including both the authorization token and an "anchor" associated with the selected software products identifying the current revision and updates already on the child update service node.

In response to the update synchronization request, at block 612, the child update service node obtains an update list from the parent update service node, synchronized according to the software updates "available" on the parent update service node according to what is currently stored on the child update service node. As mentioned above, the update list identifies, by a unique identifier, those software updates on the parent update service node that are "available" to the child update service node. Thereafter, the exemplary subroutine 600 terminates.

With reference again to FIG. 5, after having obtained a synchronized update list from the parent update service node, at decision block 504, a determination is made as to whether any software updates are currently "available" for downloading from the parent update service node. This determination is made according to whether there are any update identifiers listed in the synchronized update list. If no software updates are currently "available" for downloading, the exemplary routine 500 proceeds to delay block 510, where the exemplary routine delays/sleeps until the next update period occurs. Alternatively, if there are updates "available" for downloading from the parent update service node, at block 506, the child update service node obtains the updates from the parent update service node. Obtaining "available" updates from the parent update service node is described below with regard to FIG. 7.

Figure 7:
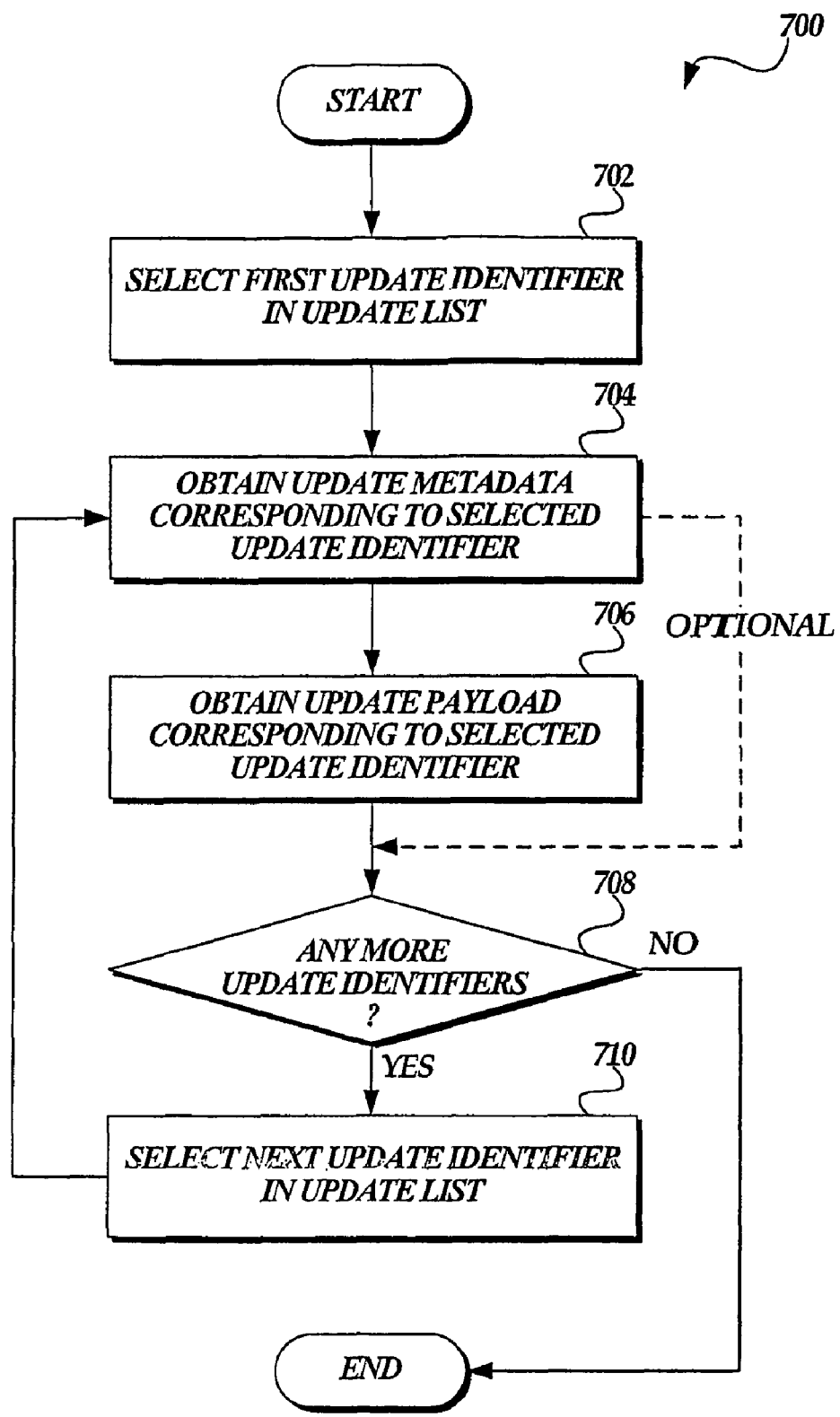
FIG. 7 is a flow diagram of an exemplary subroutine suitable for use in the exemplary routine of FIG. 5 for obtaining a software update from a parent update service node.

FIG. 7 is a flow diagram of an exemplary subroutine 700, suitable for use in the exemplary routine 500 of FIG. 5, for obtaining "available" software updates from a parent update service node. Beginning at block 702, a first update identifier in the update list is selected. At block 704, the child update service node obtains the update metadata corresponding to the selected update identifier from the parent update service node and stores it in the update information store 216.

According to one embodiment, at block 706, the child update service node obtains the update payload corresponding to the selected update identifier from the parent update service node, and stores the update payload in the update content store 212. Optionally, the update content need not be immediately downloaded to the child update service node. As previously mentioned, a child update service node may be selectively configured to download updates from a parent update service node in a just-in-time fashion. According to this optional treatment, as illustrated in FIG. 7, rather than proceeding from block 704 to block 706, the exemplary subroutine 700 optionally proceeds from block 704 to decision block 708.

At decision block 708, after having obtained the update metadata for the selected update identifier, and optionally the update payload, a determination is made as to whether there are any additional update identifiers in the update list. If there are additional update identifiers, at block 710, the next update identifier in the update list is selected, and the subroutine 700 returns to block 704 for additional processing. The routine 700 continues until, at decision block 708, it is determined that there are no more update identifiers in the update list, whereupon the exemplary subroutine 700 terminates.

Returning again to FIG. 5, after having obtained the "available" updates from the parent update service node, at block 508, the child update service node reports the update activities to the parent update service node. Thereafter, at delay block 510, the exemplary routine 500 delays/sleeps for a predetermined amount of time until the next update period, and then proceeds to block 502 to repeat the above-identified update procedures.

As illustrated in FIG. 5, at decision block 504, even when no updates are "available" on a parent update service node, a child update service node may be optionally configured to report its update activities to the parent update service node. According to this alternative configuration, when there are no updates available, the exemplary routine 500 may proceed to block 508 to report the update activities.

Figure 8:
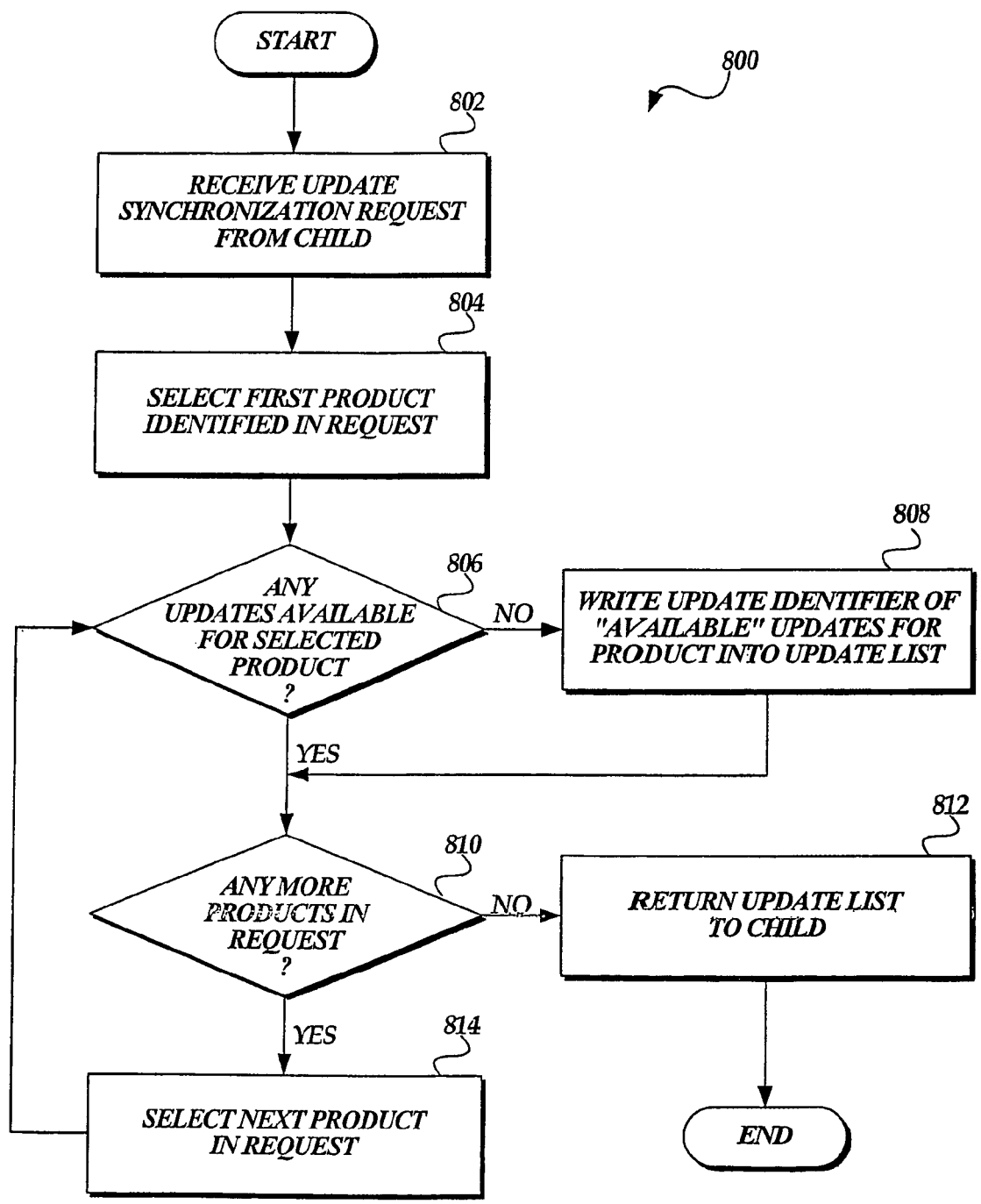
FIG. 8 is a flow diagram of an exemplary routine for processing an update request from a child update service node.

FIG. 8 is a flow diagram of an exemplary routine 800, implemented on a parent update service node, for generating a synchronized update list identifying "available" updates in response to an update synchronization request from a child update service node. Beginning at block 802, the parent update service node receives an update synchronization request from a child update service node for an update list identifying "available" updates. At block 804, the first software product identified in the update synchronization request is selected.

At decision block 806, a determination is made as to whether there are any available updates for the identified software product. This determination is made according to metadata for the software product stored in the update information store 216, according to the update anchor provided by the child update service node, and according to distribution rules associated with the group to which the child update service node belongs. According to this determination, if there are updates "available," at block 808, unique update identifiers associated with the "available" updates are written into an update list. After having written unique update identifiers for "available" updates into the update list, at decision block 810, a determination is made as to whether there are any more additional software products identified in the update synchronization request. If there are additional update software products in the update synchronization request, at block 814, the parent update service node selects the next software product identified in the update synchronization request, and returns to decision block 806 for determining whether there are "available" updates for the selected software product. Alternatively, if there are not more software products identified in the update synchronization request, at block 814, the update list is returned to the child update service node. Thereafter, the exemplary subroutine 800 terminates.

As mentioned above, an update service node is administered through the administration API 212 via the administration user interface 218, or some other similarly equipped module. To better understand how the administration API 212 operates, FIG. 9 is a pictorial diagram for illustrating how the administration API is utilized with regard to configuring an update service node to distribute software updates to client computers.

Figure 9:
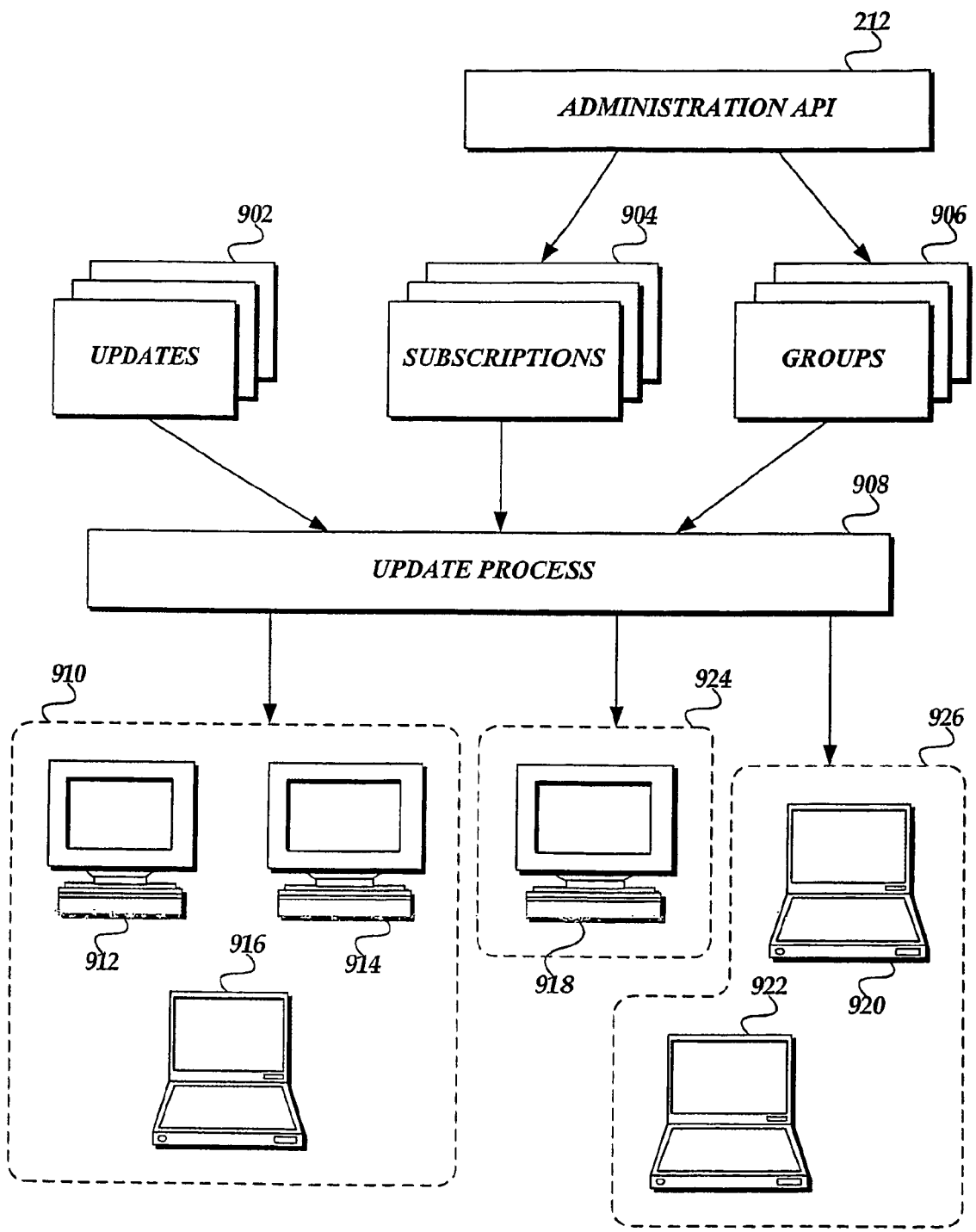
FIG. 9 is a pictorial diagram for illustrating how the administration API is utilized with regard to configuring an update service node to distribute software updates to client computers.

As shown in FIG. 9, an administrator uses the administration API to generate subscriptions 904 and groups 906. The update service node, during an update process 908, uses the updates 902 available to that update service node, as well as the subscriptions 904 and groups 906, to distribute the updates to client computers, such as client computers 912-922.

As those skilled in the art will appreciate, an administrator generates a subscription to updates for a particular product or product family, as well as the class of update. For example, a product may be Microsoft Corporation's Internet Explorer product, and a subscription would indicate this product in waiting for available updates. Similarly, a product family would typically indicate a number of products, such as Microsoft Corporation's Office as a product family, that includes numerous identifiable products. Subscriptions also typically identify the type of update that is approved for download onto client computers. For example, the type of an update may be critical, severe, general, etc.

According to one embodiment of the present invention, client computers are organized into groups, and subscriptions and updates are applied to groups. In an actual embodiment, each client computer belongs to two groups: an all computers group, and one other group. According to this actual embodiment, the update service node has defined the all computers group and one other, an unassigned computers group. Through the administration API 212, the administrator is free to define any number of other groups, and assigned client computers to a group. Failing to assign a client computer to a group leaves the client computer in the unassigned group. In short, according to this embodiment, a client computer belongs to the all computers group and one other. Groups may include any number of clients computers. Groups of client computers, for applying software updates, are illustrated in FIG. 9 as boxes 910, 924, and 926.

According to an actual embodiment, the administration API 212 is the interface through which Microsoft Corporation's Windows Software Update Services is configured and administered. In this embodiment, the administration API 212 is generally implemented by or accessible through the interface object IUpdateServer. The description of an actual embodiment of the IUpdateServer interface object is listed at the end of this section as Table 1. This IUpdateServer interface object is part of the administration API document included as part of the U.S. Provisional Application No. 60/553,042, filed Mar. 12, 2004, which is incorporated herein by reference. However, various interface calls identified in Table 1 are generally described below in regard to FIG. 10.

Figure 10:
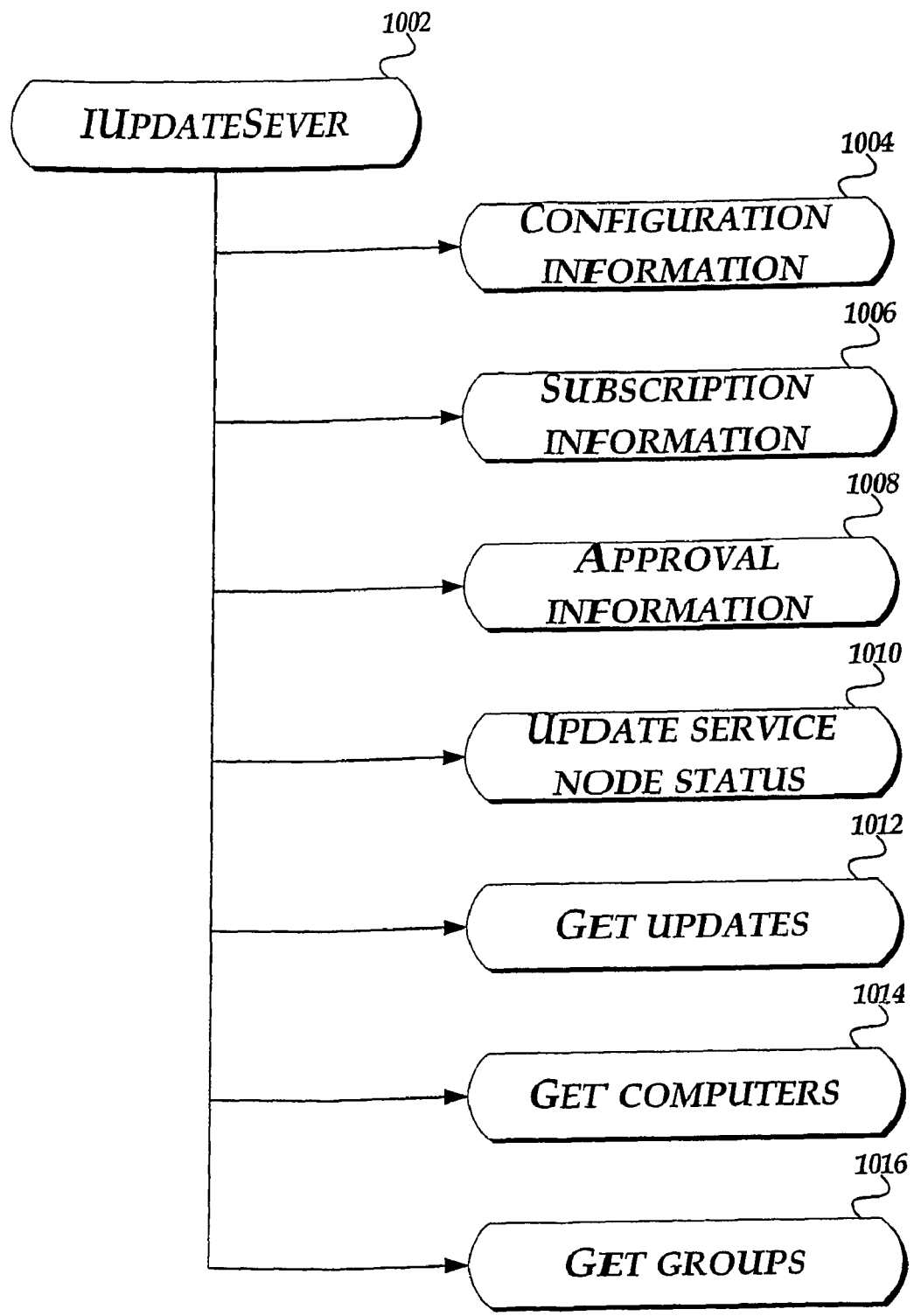
FIG. 10 is a block diagram illustrating certain administration API calls for administering the distribution of software updates on an update service node.

FIG. 10 is a block diagram illustrating certain administration API calls for administering the distribution of software updates on an update service node. With access to an IUpdateServer 1002 object, a caller can make interface calls for obtaining update service node configuration information 1004, current subscription information 1006, current approval rules 1008, update service node status information 1010, get updates 1012, get client computers 1014, and get groups 1016.

The configuration information interface call 1004 provides access to configurable (and readable) values of the update service node, including, but not limited to, available languages, who is the parent update service node and location for that parent update service node, proxy servers and addresses, the mode in which the update service node synchronizes updates with its parent update service node, and the like. In an actual embodiment, as described in Table 1, the configuration information interface call 1004 is the "GetConfiguration" interface call on the IUpdateServer object, which returns an instance of an IConfiguration interface object for the update service node. The IConfiguration interface object is described in greater detail in the incorporated API of the provisional application.

The subscription information interface call 1006 provides access to subscription information, including, but not limited to, the status of the most recent subscription efforts, when the next subscription effort (e.g., downloading a particular update to a client computer) will be completed, the frequency of the subscription synchronization, and the like. In an actual embodiment, there are at least two different interface calls to obtain subscription information. The "GetSubscrition" interface call on the IUpdateServer object returns a ISubscription interface object corresponding to a specific subscription on the update service node, and the "GetSubscriptions" interface call returns a collection of ISubscription interface objects. Additionally, a subscription is created using the "CreateSubscription" interface call, which creates an empty subscription on the update service node. Details of the ISubscription interface object are described in the incorporated API of the provisional application.

The update service node status interface call 1010 provides access to update service node status including, but not limited to, the currently deployed updates, available updates, and the like. In an actual embodiment, the "GetUpdatesSummary" interface call returns a summary collection object describing overall update summary information for the update service node. Details regarding this interface call are described in the incorporated API of the provisional application.

The get updates interface call 1012 provides access to information regarding available software updates. More particularly, the interface call provides access to all software updates available in the system. In an actual embodiment, there are several interface calls to obtain update information. The "GetUpdate" interface call returns an IUpdate object that provides information regarding a specific update on the system. Additionally, the "GetUpdates" interface call returns a collection of IUpdates objects available to the system. Additional details regarding these interface calls is provided in the incorporated API of the provisional application.

The get computers interface call 1014 provides access to the client computers associated with the update service node. In an actual embodiment, there are at least two interface calls to access information regarding the various client computers, including, but not limited to, a "GetComputer" interface call that returns an IComputer object corresponding to a client computer identified in the interface call, and a "GetComputers" interface call that returns a collection of IComputer objects, the collection includes all client computers associated with the update service node. As above, additional details regarding this interface calls on the IUpdateServer object are described in the incorporated API of the provisional application.

The get groups interface call 1016 provides access to the groups defined on the update service node. As mentioned above, in an actual embodiment, each client computer belongs to the all-computers group and one other group. If a client computer is not assigned to a group, that client computer defaults to the unassigned group. In at least this actual embodiment, a number of interface calls are available including, but not limited to, a "GetTargetGroup" interface call that returns an ITargetGroup object corresponding to a group identifier passed to the interface call, and a "GetTargetGroups" interface call that returns a collection of ITargetGroup objects corresponding to all groups defined on the update service node.

Those skilled in the art will appreciate that while some of the interface calls have been described, they are not an exhaustive set of interface calls. Indeed, an actual embodiment of an administration API includes numerous interface calls, the majority of which have not been specifically described.

With regard to the following table, Table 1, the abbreviation WUS is an acronym for Windows Update Server.

TABLE 1

| IUpdateServer | |
|---|---|
| Use this interface to access Update Server components. The IUpdateServer interface is derived from the System.Object class. Public Methods The IUpdateServer interface has the following public methods. | |
| Method | Description |
| CancelAllDownloads( ) | Cancels updates that are currently being downloaded to the WUS server. |
| CreateComputerTargetGroup(String) | Creates a target group that you use to target client computers for updates. |
| Equals(Object) | Determines if the specified Object is equal to the current Object. |
| GetComponentsWithErrors( ) | Retrieves a list of server components that are currently in an error state. |
| GetComputersNotContactedSinceCount(DateTime) | Number of clients that have not reported their status to the WUS server since the specified time. |
| GetComputerTarget(String) | Retrieves the specified client computer. |
| GetComputerTargetGroup(Guid) | Retrieves the specified target group. |
| GetComputerTargetGroups( ) | Retrieves a collection of all the target groups on the WUS server. |
| GetComputerTargets( ) | Retrieves a collection of all client computers that are known to the WUS server. |
| GetConfiguration( ) | Retrieves an IUpdateServerConfiguration that you use to configure the WUS server. |
| GetContentDownloadProgress( ) | Retrieves the progress of all updates that are currently downloading. |
| GetDatabaseConfiguration( ) | Retrieves an IDatabaseConfiguration that you use to determine the database configuration. |
| GetDownstreamServer(String) | Retrieves an interface to the specified downstream WUS server. |
| GetDownstreamServers( ) | Retrieves a collection of downstream WUS servers that are registered with this WUS server. |
| GetHashCode( ) | Serves as a hash function for a particular type. GetHashCode is suitable for use in hashing algorithms and data structures like a hash table. |
| GetInstallApprovalRule( ) | Retrieves the approval rule that is used to automatically download and install updates on target computers. |
| GetRootUpdateCategories( ) | Retrieves a collection of the top-level categories on the WUS server. |
| GetScanApprovalRule( ) | Retrieves the approval rule used to automatically scan the target computers to determine if the update is applicable. |
| GetStatus( ) | Retrieves statistics that summarize the current state of the WUS server, updates, and the client computers. |
| GetSubscription( ) | Retrieves a subscription instance that you use to manage the synchronization process. |
| GetSubscriptionEvent(Guid) | Retrieves a subscription event that identifies changes to the subscription. |
| GetSynchronizationInfo(Guid) | Retrieves information that is related to a specific synchronization process. |
| GetType( ) | Retrieves the Type of the current instance. |
| GetUpdate(UpdateRevisionId) | Retrieves the specified update. |
| GetUpdateApproval(Guid) | Retrieves the specified approval. |
| GetUpdateCategories( ) | Retrieves the list of all update categories that are known to the WUS server. |
| GetUpdateCategories(DateTime, DateTime) | Retrieves the update categories that were added within the specified date range. |
| GetUpdateCategory(Guid) | Retrieves the category of updates for the given identifier. |
| GetUpdateClassification(Guid) | Retrieves the requested update classification. |
| GetUpdateClassifications( ) | Retrieves a collection of update classifications that are known to the WUS server. |
| GetUpdateClassifications(DateTime, DateTime) | Retrieves the update classifications that were added within the specified date range. |
| GetUpdateEventHistory(DateTime, DateTime) | Retrieves all installation events for all clients for the specified date range. |

TABLE 1-continued

| IUpdateServer | |
|---|---|
| GetUpdateEventHistory(DateTime, DateTime, IComputerTarget) | Retrieves all installation events that were raised by the specified client for the specified date range. |
| GetUpdateEventHistory(DateTime, DateTime, IUpdate) | Retrieves all installation events that were raised by all clients for the specified update and date range. |
| GetUpdateEventHistory(DateTime, DateTime, IUpdate, WusEventSource, WusEventId[ ]) | Retrieves events based on the specified criteria. |
| GetUpdates( ) | Retrieves a collection of the latest revision of each update. |
| GetUpdates(ApprovedStates, DateTime, DateTime, UpdateCategoryCollection, UpdateClassificationCollection) | Retrieves a collection of updates based on the specified criteria. |
| LogMessage(LogLevel, String, params Object[ ]) | Logs a message to the software distribution log file. |
| RegisterComputer(String) | Registers a client computer with the WUS server. |
| ResetAndVerifyContentState( ) | Forces the synchronization of all update metadata on the WUS server and verifies that all update files on the WUS server are valid. |
| ResumeAllDownloads( ) | Identifies the updates to download. |
| SearchComputerTargets(String) | Retrieves a collection of target computers whose full domain name contains the given string. |
| SearchUpdates(String) | Retrieves a collection of updates whose metadata contains the given string. |
| ToString( ) | Retrieves a String that represents the current Object. |

Public Properties
The IUpdateServer interface has the following public property.

| Property | Description |
|---|---|
| PreferredCulture | Retrieves or sets the language code that you want the WUS server to use when returning strings. |

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. An update service node for administering the distribution of software updates, the update service node comprising a processor:
an update store for storing software updates;
an update web service through which the update service node obtains software updates from a parent update service node over a communication network, the update service node checking the parent update service node for newly available updates hourly, and through which the update service node distributes software updates to child update service nodes over the communication network, the update web service being operable to create a catalog of software updates, receive a request for the catalog from a particular child update service node, and responsively provide a catalog listing a limited set of software updates based on a distribution group to which the particular child update service node belongs; and
an administration application programming interface (API) through which an administrator defines distribution groups, and establishes distribution rules associated with each group, the distribution rules specifying the distribution of software updates to child update service nodes and client computers included in the respective distribution groups, wherein the administration API is an object exposing a plurality of interface calls through which the administrator establishes said rules.

2. The update service node of claim 1, wherein the administration API exposes a get configuration interface call which returns a configuration interface object for reading and writing software update administration configuration values to the update service node.

3. The update service node of claim 2, wherein the configuration interface object is an IConfiguration interface object.

4. The update service node of claim 2, wherein the administration API exposes a get subscription interface call which returns a subscription interface object corresponding to a subscription identifier passed to the get subscription interface call.

5. The update service node of claim 4, wherein the subscription interface object is an ISubscription interface object.

6. The update service node of claim 4, wherein the administration API exposes a get subscriptions interface call which returns a subscription collection interface object defined on the update service node.

7. The update service node of claim 4, wherein the administration API exposes a get update interface call which returns a update interface object corresponding to an update identifier passed in the get update interface call.

8. The update service node of claim 7, wherein the update interface object is an IUpdate interface object.

9. The update service node of claim 7, wherein the administration API exposes a get updates interface call which returns an update collection object containing update interface objects corresponding to values passed in the get updates interface call.

10. The update service node of claim 9, wherein the values passed to the get updates interface call include a deployed state object and an exclude hidden updates Boolean value.

11. The update service node of claim 9, wherein the administration API exposes a get computer interface call which returns an client computer object corresponding to the a client computer associated with the update service node and that was identified in the get computer interface call.

12. The update service node of claim 11, wherein the client computer object is an IComputer object.

13. The update service node of claim 11, wherein the administration API exposes a get computers interface call which returns a computer collection object including client computer objects corresponding to client computers associated with the update service node.

14. The update service node of claim 13, wherein the administration API exposes a get group interface call which returns an target group object that was identified in the get group interface call.

15. The update service node of claim 14, wherein the administration API exposes a get groups interface call which returns a target group collection object including target group objects corresponding to target groups on the update service node.

16. The update service node of claim 1, wherein the administration API is an IUpdateServer interface object.

17. The update service node of claim 1, wherein the update web service is further operable to provide selected updates to the child update service node based on one or more selections from the child update service node, the one or more selections being identified in the catalog listing a limited set of software updates.

18. A software update distribution system for distributing software updates, the software update distribution system comprising:
   a software update store storing a set of software updates;
   an update service node operable to receive a product catalog request from a particular computer and responsively provide a product update catalog listing a limited set of the software updates, the limited set of software updates being only those software updates that the particular computer is authorized to distribute based on a target group to which the particular computer belongs; and
   an administration application programming interface (API) associated with the update service node, wherein the administration API is an interface object exposing a plurality of interface calls for controlling the distribution of software updates, the administration API including:
      a create computer target group through which at least two target groups are defined including an all-computers group and an evaluation target group for evaluating software updates prior to distribution to the all-computers group;
      a get configuration interface call which returns a configuration interface object for reading and writing software update administration configuration values to the update service node;
      a get subscription interface call which returns a subscription interface object defined on the update service node;
      a get update interface call which returns an update interface object corresponding to an update identifier passed in the get update interface call;
      a get updates interface call which returns an update collection object containing update interface objects corresponding to values passed in the get updates interface call;
      a get computer interface call which returns a client computer object corresponding to a client computer associated with the update service node and that was identified in the get computer interface call;
      a get computers interface call which returns a computer collection object including client computer objects corresponding to client computers associated with the update service node;
      a get group interface call which returns a target group object that was identified in the get group interface call;
      a get groups interface call which returns a target group collection object including target group objects corresponding to target groups on the update service node;
      a cancel all downloads call which cancels all currently downloading updates;
      a get computers not contacted since count call which returns a number of clients that have not reported status to the update service node since a specified time;
      a get content download progress call which retrieves the progress of all currently downloading updates; and
      a get scan approval rule call which retrieves an approval rule used to automatically scan one or more target computers to determine if a potential update is applicable.

19. A computer-implemented method for distributing software updates to computing devices in a network, the method comprising:
   through an application programming interface on an update service node:
      defining a general group of computing devices and an evaluation group of computing devices, each of the general group of computing devices and the evaluation group of computing devices comprising a respective child update service node configured to distribute software updates to one or more client computing devices of the group;
      associating software update distribution rules with each of the general group and the evaluation group;
      receiving a software update; and
      based on the software update distribution rules:
         immediately distributing the software update to the child update service node of the evaluation group, the child update service node of the evaluation group being configured to distribute the software update to client computing devices of the evaluation group for evaluation of the software update;
         withholding the software update from the general group of computing devices until the software update is authorized for distribution to the general group of computing devices based on the evaluation of the software update;
         after the software update has been evaluated by the evaluation group, authenticating a child update service node of the general group; and
         sending a time-sensitive token to the child update service node of the general group, the time-sensitive token authorizing the particular child update service node of the general group to request updates for a limited time.

20. The computer-implemented method of claim 19, further comprising:
receiving a request for a product update catalog from the child update service node, the request including the time-sensitive token;
sending a product update catalog to the child update service node, the product update catalog listing a limited set of software updates available for distribution to the child update service node, the limited set of software updates being determined based on the group in which the child update service node is a member; and
receiving a selection of one or more software updates listed in the product update catalog from the child update service node.

* * * * *